Jan. 23, 1968   F. S. ROACH   3,364,792
LOCKING DIFFERENTIAL
Filed Sept. 20, 1965   2 Sheets-Sheet 1
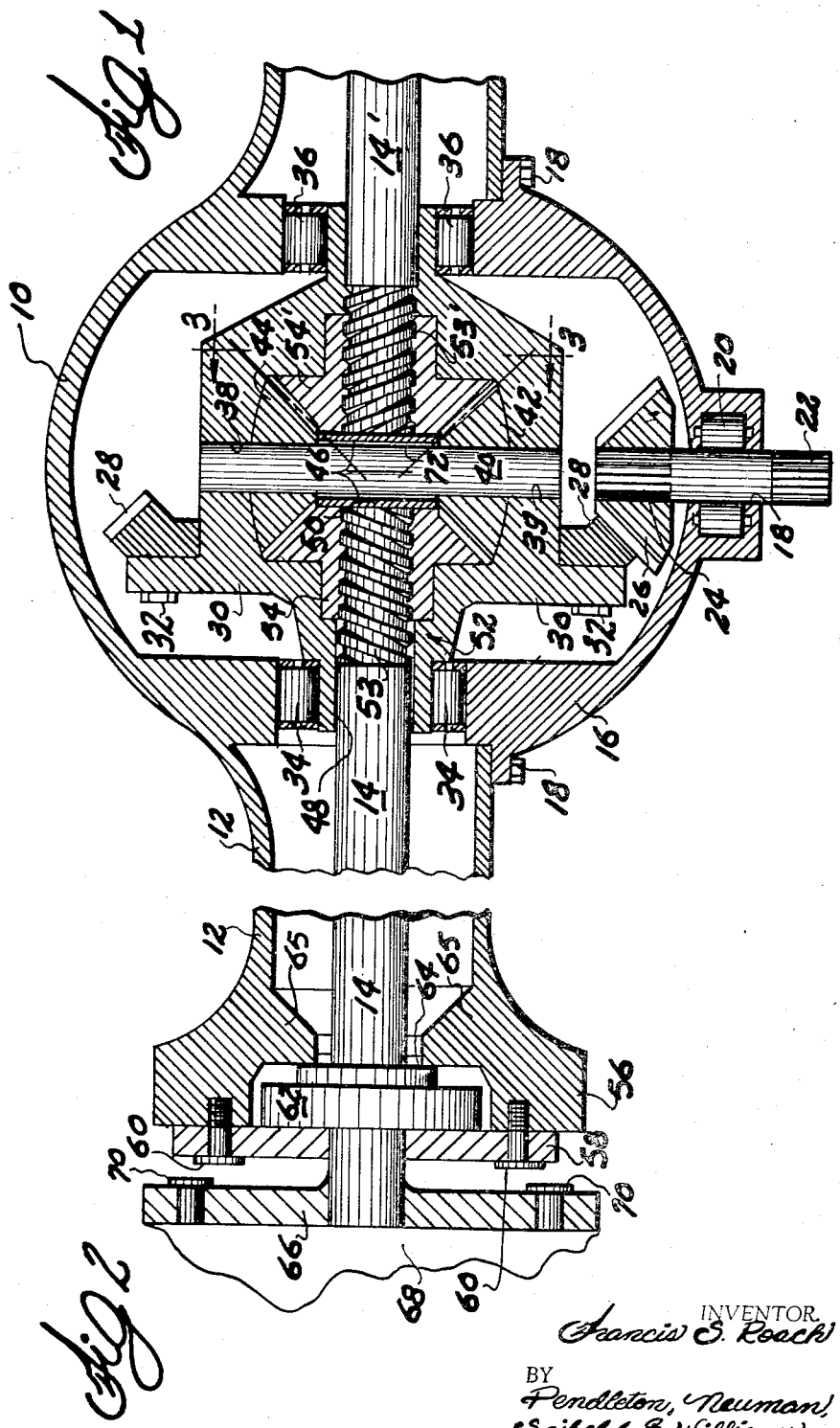
INVENTOR.
Francis S. Roach
BY
Pendleton, Neuman,
Seibold & Williams
Attorneys Jan. 23, 1968   F. S. ROACH   3,364,792
LOCKING DIFFERENTIAL
Filed Sept. 20, 1965   2 Sheets-Sheet 2

INVENTOR.
Francis S. Roach
BY
Pendleton, Neuman,
Seibold & Williams
Attorneys

United States Patent Office 3,364,792
Patented Jan. 23, 1968

3,364,792
LOCKING DIFFERENTIAL
Francis S. Roach, 628 Lincoln Blvd.,
Freeport, Ill. 61032
Filed Sept. 20, 1965, Ser. No. 488,394
11 Claims. (Cl. 74—711)

ABSTRACT OF THE DISCLOSURE

This disclosure relates to a locking differential in which the axles are threadably engaged with the bevel gears of a spider differential. The inner ends of the axles or the bevel gears may frictionally engage a stop block, loosely mounted on a shaft interconnecting opposed pinions of the differential, to resist relative rotation between the axles when they are urged inwardly or outwardly by relative rotation between the axles and their respective bevel gears.

---

This invention relates to locking differentials, and more particularly to differentials which are adapted to normally lock a pair of driven wheel axles together, and when one or the other of the axles loses traction, and to release such lock when the axles are differentiating.

Many attempts have been made in the prior art to provide locking differentials, especially for automobiles, where, when one wheel loses traction on ice, mud, or the like, very little power is applied to the wheel having traction. Most of the power transmitted by ordinary differentials goes to spin the wheel having the lesser traction.

In many of the prior art locking differentials, means are provided to sense a relative angular rotation of the two wheel axles, and apply a torque to restrain such rotation. Such devices cannot discriminate, however, between loss of traction and sharp corners at moderate or high speeds, so that the main purpose of the differential, viz, to allow for differentiating, is at least partially defeated. In addition, such differentials cannot be effectively employed on farm tractors and the like where turning is customarily accomplished by applying a braking torque to one of the wheels, which determines a pivot point for the vehicle to swing around. This operation would cause the prior art differentials of this type to lock, thus hampering the turning.

Accordingly, it is an object of the present invention to provide a locking differential which is adapted to be normally locked, with means to unlock it when differentiating.

Another object of the present invention is to provide a locking differential which may be employed in a vehicle system designed to use braking power for turning.

A further object of the present invention is to provide a locking differential of about the same size as an ordinary spider differential, without requiring larger housings, larger gears, or a different arrangement of parts.

Another object of the present invention is to provide a locking mechanism for a differential which can be employed with an ordinary spider differential, the latter being easily modified to incorporate the locking feature of the present invention.

These and other objects and advantages of the present invention will become manifest upon an inspection of the following description and the accompaying drawings.

In one embodiment of the present invention there is provided all of the components of an ordinary spider differential, including a differential case supporting a shaft having a pair of compensating pinions, a pair of bevel gears meshing with the pinions and a wheel axle for each bevel gear. The ordinary spider differential is modified in accordance with the present invention by the provision of a stop block mounted on the pinion shaft between the pinions, and the provision of a threaded connection between each of the wheel axles and its corresponding bevel gear, instead of the ordinary splined connection.

Reference will now be made to the accompanying drawings, in which:

FIG. 1 is a horizontal cross-sectional view of a complete differential embodying the present invention;

FIG. 2 is a horizontal cross-section of an axle and wheel assembly incorporated in an embodiment of the present invention;

Figure 3:
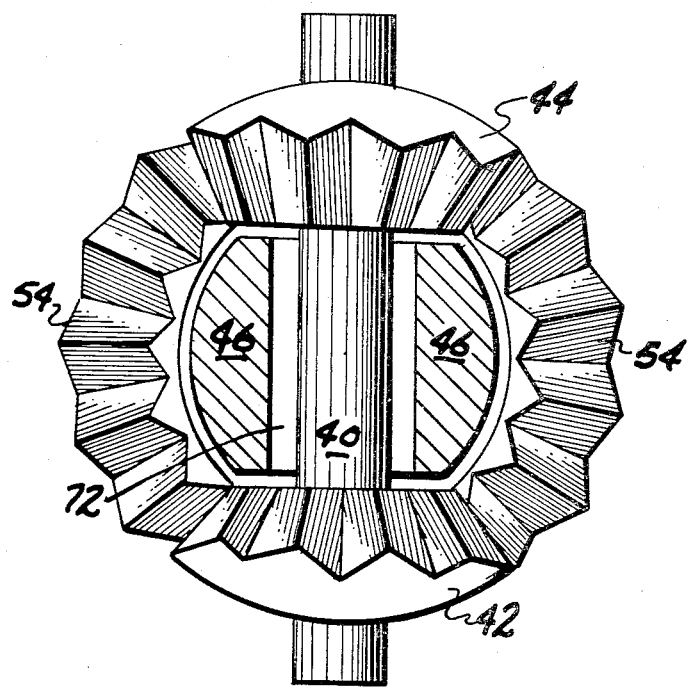
FIG. 3 is a vertical cross-sectional view of a portion of the apparatus illustrated in FIG. 1 taken along the line 3—3.

Referring now to FIG. 1, there is illustrated a differential assembly having an outer housing 10 connected to a tubular axle housing 12 within which a wheel axle 14 is mounted. Although only one axle housing 12 and one axle 14 are fully illustrated in FIG. 1, it will be understood that the apparatus is symmetrical about a central plane, with corresponding parts provided for each side of the unit. Bolted to the outer housing 10 is a housing 16, which is removably mounted on the housing 10 by means of bolts 18. The housing 16 is provided with an aperture 18 having a bearing 20 supporting the drive shaft 22 of the motor vehicle. The shaft 22 is provided with splines 24 by which the shaft is connected to a driving pinion 26. The driving pinion 26 cooperates with the teeth of a ring gear 28 bolted to a differential case 30 by bolts 32. A pair of bearings 34 and 36 are provided between the differential case 30 and the housings 10 and 16, so that the differential case 30 may be supported by, and be rotated freely within the housings 10 and 16, in response to the turning of the ring gear 28.

The differential case 30 is provided with a pair of aligned bores 38 and 39 in which a shaft 40 is supported. A pair of compensating pinions 42 and 44 are rotatably mounted on the shaft 40, and are spaced apart on the shaft 40. The outer surfaces of the compensating pinions 42 and 44 are shaped to conform to the corresponding surfaces of the differential case 30. A stop block 46 is mounted on the shaft 40 between the pinions 42 and 44.

The axle 14 leading to one of the wheels of the vehicle is aligned with a bore 48 in the differential case 30, and extends inwardly of the differential case 30 with the end 50 of the axle, adjacent the stop block 46. The end portion 52 of the axle 14 is provided with external threads 53, and a bevel gear 54, which is provided with corresponding internal threads, is mounted on the end portion 52. The bevel gear 54 is freely rotatable on the shaft 14, within the confines of the space provided within the differential case 30 for movement of the bevel gear on the threads 53 in a direction parallel to the axis of the shaft. The shaft 14' on the other side of the differential is provided with an identical bevel gear 54', and an identical threaded connection between the end portion of the shaft 14' and its corresponding bevel gear 54', by means of threads 53. The threads 53' wind oppositely about the axle 14' from the threads 53 on the axle 14. As the differential case 30 rotates, the pinions 42 and 44 tend to rotate the bevel gears 54 and 54' so as to cause them to move outwardly on their respective axles 14 and 14' when the transmission is being powered in a forward direction. Similarly, when the motion is in the reverse direction, the pinions 42 and 44 rotate in the opposite direction and screw the bevel gears 54 and 54' inwardly on their respective axles against the stop block 46.

Referring now to FIG. 2, there is illustrated a wheel construction employed with the locking differential of the present invention. The tubular casing 12 is provided with a flanged terminal portion 56, and a plate 58 is bolted to the terminal flange 56 by bolts 60. A bearing assembly 62 is pressed onto the axle 14, and is held in place by the plate 58. A ring 64 is welded to the axle 14 interiorly of the bearing 62 and prevents the axle 14 from moving outwardly. The axle 14 is restrained from moving inwardly with respect to the vehicle by an annular projection 65 on the inside of the housing 12, spaced by a short distance from the ring 64. Thus the axle 14 is substantially prevented from any lateral movement, although a slight amount of lateral movement is possible, as will be discussed more fully hereinafter.

A plate 66 is welded to the end of the axle 14, and a wheel assembly 68, indicated diagrammatically, is bolted to the plate 66 by bolts 70.

Figure 4:
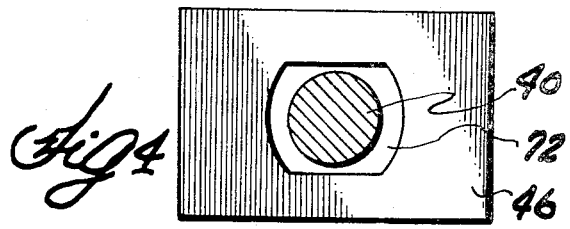
FIG. 4 is a plan view of a stop block incorporated in the apparatus illustrated in FIG. 1.

Referring now to FIGS. 3 and 4, the arrangement of the assembly including the shaft 40, the stop block 46 and and the pinions 42 and 44, is shown in more detail. The stop block 46 is provided with an aperture 72 which is substantially larger in diameter than that of the shaft 40. Thus the stop block 46 is free to assume any position within the interior of the assembly into which it may be forced by the action of the ends of the axles 14 and 14' or of the interior surfaces of the bevel gears 54 and 54'. In the normal condition, when the vehicle is being propelled in a forward direction, the inner ends of the axles 14 and 14' are both urged against opposite sides of the stop block 46. When the condition of the transmission and differential is such that the vehicle is being propelled in reverse, the inner ends of the bevel gears 54 and 54' bear against the opposite sides of the stop block 46. When the differential is differentiating, as for example when the vehicle is rounding a corner so that one axle rotates at a faster speed than the other, the inner end of the slower moving axle bears on one face of the stop block 46, and the bevel gear associated with the opposite axle bears on the opposing face of the stop block 46. The aperture 72 within the stop block 46 is made sufficiently large so that neither the inner ends of the axles 14 and 14' nor the inner surfaces of the bevel gears 54 and 54' cause the stop block 46 to bear on the shaft 40, thereby minimizing wear between the stop block 46 and its supporting shaft 40.

In operation of the differential, the axles 14 and 14' are normally locked together by virtue of their inner ends frictionally bearing on the stop block 46. The rotation of the differential case 30 causes the bevel gears 54 and 54' to move outwardly so that their exterior surfaces 54a engage corresponding surfaces 54b of the differential casing 30. Although, as has been described, the axles are substantially restrained in their axial movement, the only thing to restrain the inward movement of the axles is the stop block 46. Consequently, the ends of the axles bear against the stop block 46 by the action of the bevel gears 54 and 54' being urged against threads 53 and 53' by the pinions 42 and 44. Thus the two axles 14 and 14' are effectively locked together, in that each is in frictional engagement with the stop block 46.

The differential may be unlocked in response to a differentiating condition, in which one of the wheels runs faster than the other, as for example when rounding a corner. When this occurs, the faster running axle will attempt to screw its inner end out of the bevel gear, thus relieving the engagement of its inner end with the stop block 46. The bevel gear remains adjacent the differential case 30, where it is urged by the power applied via the pinions 42 and 44, and the pinions rotate to compensate for the difference between the axles 14 and 14'. This breaks the frictional connection between the end of the faster running axle and the stop block 46, and permit faster rotation of one axle relative to the other. The stop block 46 moves toward the withdrawing end of the faster running axle, and the slower running axle cannot maintain frictional contact with the stop block 46 because its ring 64 is stopped by the projection 65. When the differentiating is stopped as the two axles resume the same rate of angular rotation, the two axles 14 and 14' again become locked.

When the vehicle in which the differential of the present invention is employed is in a situation where one of the wheel axles 14 and 14' loses traction, the locking aspect of the differential is the same as when the differential is in the normal driving condition. For example, if the axle 14 is connected to the wheel which has less traction than the other one due to its wheel being on mud, ice or the like, the opposite shaft would receive most of the torque in an ordinary differential. In the differential of the present invention, however, the compensating pinions 40 and 42 force both of the bevel gears 54 and 54' outwardly until they bear on the interior surface of the casing 30, and the axles 14 and 14' inwardly until their ends bear on the stop block 46. In this condition the friction resulting from relative movement between the axle 14 and the stop block 46 opposes a difference in angular velocity of these two components, thus tending to make the stop block 46 and both the axles 14 and 14' rotate together, which in turn tends to equalize the torque applied to the two axles, irrespective of which axle has the greater traction.

When the vehicle is being driven in its reverse direction, the operation is the same except that in this case the friction between the stop block 46 and the inner faces of the bevel gears 54 and 54' furnishes the needed resistance to equalize the torque.

The differential of the present invention may be employed in a vehicle which accomplishes turning by braking one or the other of the axles 14 and 14'. In this case, the rotation of the axle being braked is slowed by virtue of the braking resistance, which gives rise to a difference in the rate of rotation of the two axles 14 and 14', and releases the lock on the faster moving axle, just as in the case of differentiating while rounding a corner in a vehicle with more conventional steering.

It will be noted that in the operation of the invention the locking torque is created by the frictional resistance between the stop block 46 and the inner ends of the axles 14 and 14' (in forward drive) and the inner ends of the bevel gears 54 and 54' (in reverse drive). Although it is contemplated that the materials of which all of these components are composed are sufficiently hard that none of these components would wear out during the normal life of the vehicle, it is within the scope of the present invention to form the stop block 46 of material which is slightly softer than the axles and the bevel gears, so that if any component needs to be replaced, it will be the stop block 46. This component can be readily replaced in a vehicle by removing the casing 16, and then removing the shaft 40 from the differential casing 30, sliding it out of the pinions 42 and 44 and the stop block 46. A new stop block 46 may be substituted between the same pinions 42 and 44, and the shaft 40 reassembled in the differential case 30. Thus the use of the differential of the present invention does not interfere with the enjoyment of the vehicle due to the necessity of frequent costly repairs. Replacement of the stop block 46 in the present invention requires only a simple and economical procedure.

If desired, bearings may also be incorporated between the outer faces 54a of the bevel gears 54 and 54' and, also between the outer faces faces of the pinions 42 and 44 and the interior surface of the differential case 30.

It will be apparent to those skilled in the art that the present invention is readily adaptable to differentials of the ordinary type, it being necessary only to replace the ordinary splined connection between the axles and the corresponding bevel gears with the threaded connections of the present invention. In addition it is necessary to employ a retaining mechanism such as the plate 64 to prevent any outward lateral movement of the axles. These are modifications that may easily be made, merely by changing the machining steps involved in the axles and bevel gears, and installing the plate 64 during the assembly of the vehicle. The bevel gears 54 and 54' do not need to be any larger in diameter for the threaded connection of the present invention than they do for the conventional splined connection. In incorporating the present invention with an ordinary differential it is therefore not necessary to increase the size of the bevel gears, or of any other components of the differential.

By the foregoing the present invention has been described in such detail as to enable others skilled in the art to make and use the same and by applying current knowledge to adapt the same for use under a variety of conditions of service, without departing from the scope of the present invention, which is intended to be defined and secured by the appended claims.

What is claimed is:

1. A differential comprising a differential case, said differential case having a shaft supported for rotation thereon, said shaft carrying a pair of compensating pinions and a stop block located intermediately between said pinions, and a pair of bevel gears disposed within said differential case and meshing with said pinions; means for rotating said differential case, a pair of axles, each having an inner end portion driven by one of said bevel gears, said axles having helical threads on their said inner end portions, and said bevel gears having corresponding internal threads cooperating with threads on said axle, to permit said axles and bevel gears to move inwardly and outwardly in relation to each other in response to thrust imparted from said pinions, the inner ends of said axles frictionally abutting said stop block to resist relative rotation between said axles when both of said axles are urged inwardly by relative rotation between said axles and their respective bevel gears, and means associated with each of said axles for substantially preventing lateral motion of said axles.

2. Apparatus according to claim 1, wherein said bevel gears are adapted to move inwardly relative to said axles and bear on said stop block.

3. In a differential having a differential case, a pair of pinions mounted for rotation on a shaft disposed within said differential case, and a pair of bevel gears meshing with said pinions for transmitting torque from said pinions to separate axles, the combination comprising a separate axle for each of said bevel gears, each of said axles being provided with threads near the inner end thereof, each of said bevel gears being provided with internal threads cooperating with the threads on said axles for permitting relative movement between said bevel gears and their respective axles, and a stop block mounted on said shaft between said pinions for frictionally intercepting the inner ends of each of said axles to resist relative rotation of said axles when they are urged inwardly by relative rotation between said axles and their respective bevel gears.

4. Apparatus according to claim 3 including a ring secured to each of said axles, and bearing means disposed in fixed relation outwardly of said rings to substantially prevent said axles from moving outwardly in an axial direction.

5. Apparatus according to claim 3, wherein said stop block alternately intercepts the inner surfaces of said bevel gears and the inner ends of said axles.

6. In a differential having a differential case, a shaft disposed within said differential case supporting a compensating pinion, a pair of bevel gears meshing with said compensating pinion, and a pair of axles, each axle being in driving engagement with one of said bevel gears, the improvement comprising a stop block having a longitudinal aperture therein having a diameter larger than that of said shaft, said stop block being disposed on said shaft, and means interconnecting said axles and said bevel gears to cause the inner ends of said axles to frictionally engage said stop block upon relative rotation between said axles and their respective bevel gears.

7. Apparatus according to claim 6, wherein said interconnecting means comprises threads integral with the end portion of said axles and corresponding internal threads disposed on said bevel gears.

8. Apparatus according to claim 6 wherein said stop block is formed of material softer than that of the axles and bevel gears, so that substantially all of the wear resulting from friction between said stop block and said axles is taken by said stop block.

9. Apparatus according to claim 6 including blocking means on each of said axles preventing it from moving outwardly relative to said differential case more than a predetermined distance, and said differential case having a pair of surfaces parallel to and spaced outwardly from said bevel gears, to substantially prevent said bevel gears from moving outwardly on said axles relative to said differential case more than a predetermined distance.

10. In a differential having a differential case, a set of driven gear members disposed within said differential case, an axle for each of said driven gear members, a driving connection between each of said axles and its respective driven gear member, a plurality of driving gear members rotatably mounted within said differential case and meshing with said driven gear members, a stop block centrally disposed with respect to said driving gear members, each of said driven gear members having a stop block-engaging face and each of said axles having a stop block-engaging face for frictionally engaging said stop block upon relative rotation between said axles and their respective driven gear members, and means for connecting said axles with said driven gear members for alternately rendering the stop block-engaging faces of the respective driven gear members and axle members effective and ineffective.

11. Apparatus according to claim 10, wherein said connecting means comprises helical threads integral with said axles and corresponding threads on said driven gear members, whereby said axles and said driven gear members are alternately driven into stop block-engaging condition, in response to the direction of thrust transmitted by said driving gear members.

References Cited

UNITED STATES PATENTS

| | | | |
|---|---|---|---|
| 1,210,497 | 1/1917 | Laycock | 74—710.5 |
| 1,252,388 | 1/1918 | Bickley | 74—710.5 |
| 1,361,895 | 7/1920 | Nogrady | 74—711 |
| 1,556,101 | 10/1925 | Goodhart | 74—711 |
| 2,424,942 | 7/1947 | Mynssen | 74—711 |
| 2,431,272 | 11/1947 | Mynssen et al. | 74—711 |
| 2,495,016 | 1/1950 | Mesick | 74—711 |
| 2,841,037 | 7/1958 | Randall | 74—711 |
| 2,861,477 | 11/1958 | Mueller | 74—711 |
| 2,923,174 | 2/1960 | Gleasman | 74—711 |
| 2,945,400 | 7/1960 | Dupras | 74—711 |
| 2,985,035 | 5/1961 | Toth | 74—711 |

FOREIGN PATENTS 203,934  4/1907  Germany.

DONLEY J. STOCKING, *Primary Examiner.*

ARTHUR T. McKEON, *Examiner.*

J. R. BENEFIEL, *Assistant Examiner.*